United States Patent [19]

Kubo

[11] Patent Number: 5,404,163
[45] Date of Patent: Apr. 4, 1995

[54] IN-FOCUS DETECTION METHOD AND METHOD AND APPARATUS USING THE SAME FOR NON CONTACT DISPLACEMENT MEASUREMENT

[75] Inventor: Kazutoshi Kubo, Kawasaki, Japan

[73] Assignee: Mitutoyo Corporation, Tokyo, Japan

[21] Appl. No.: 89,104

[22] Filed: Jul. 12, 1993

[30] Foreign Application Priority Data

Jul. 14, 1992 [JP] Japan .................................. 4-186622

[51] Int. Cl.[6] .............................................. H04N 7/18
[52] U.S. Cl. .................................... 348/142; 348/345; 348/357
[58] Field of Search ............... 348/345, 353, 348, 350, 348/357, 135, 142; H04N 7/18

[56] References Cited

U.S. PATENT DOCUMENTS

| | | | |
|---|---|---|---|
| 4,473,750 | 9/1984 | Oshida et al. | 250/560 |
| 4,564,296 | 1/1986 | Oshida et al. | 356/381 |
| 4,743,771 | 5/1988 | Sacks et al. | 250/560 |
| 4,816,919 | 3/1989 | Coates | 348/353 |
| 4,829,374 | 5/1989 | Miyamuto | 348/138 |
| 4,924,247 | 5/1990 | Suzuki et al. | 348/348 |
| 4,985,777 | 1/1991 | Kawada | 348/353 |
| 5,107,337 | 4/1992 | Ueda et al. | 348/353 |
| 5,126,849 | 6/1992 | Senuma et al. | 348/353 |
| 5,204,739 | 4/1993 | Pomenicali | 348/79 |
| 5,218,395 | 6/1993 | Taniguchi et al. | 348/350 |

FOREIGN PATENT DOCUMENTS 62-2118   1/1987   Japan .
3-261804  11/1991  Japan .

OTHER PUBLICATIONS

Ligthart, Guido et al., "A comparison of Different Autofocus Algorithms," IEEE International Conference on Pattern Recognition, 1982, pp. 597–600.
Yoshitada Oshida, "Thickness Measurement of Printed Circuit Patterns Using Automatic Focusing Sensor," Automation, 7, vol. 25, No. 5, 1980, pp. 65–67.
Yoshimasa Oshima, et al., "Automatic Optical Focusing Method Applicable to Semiconductor Wafers (Aluminum Patterns)," The 22nd SICE Scientific Lecture (Jul. 27–28–29, 1983), pp. 223–224.

Primary Examiner—Howard W. Britton
Attorney, Agent, or Firm—Oliff & Berridge

[57] ABSTRACT

An image of the surface of a measuring object is picked up by a video camera while the distance to the measuring object is changed, and the in-focus state of the video camera is detected from the fact that the contrast, which is defined by the sum of the n-th (n: integer greater than 1) power of differences in brightness between adjoining pixels in the image, has reached its maximum. Further, the position of the surface of the measuring object is measured according to the position of the video camera in the in-focus state.

16 Claims, 9 Drawing Sheets

→ SCREEN SCANNING DIRECTION $$\text{CONTRAST} = \sum_y \sum_x (g_{x,y} - \bar{g})^2$$

$$\text{CONTRAST} = \sum_{y=1}^{n-1}\sum_{x=1}^{m-1}(g_{x+1,y}-g_{x,y})^2 + \sum_{x=1}^{m-1}\sum_{y=1}^{n-1}(g_{x,y+1}-g_{x,y})^2$$

F I G. 7
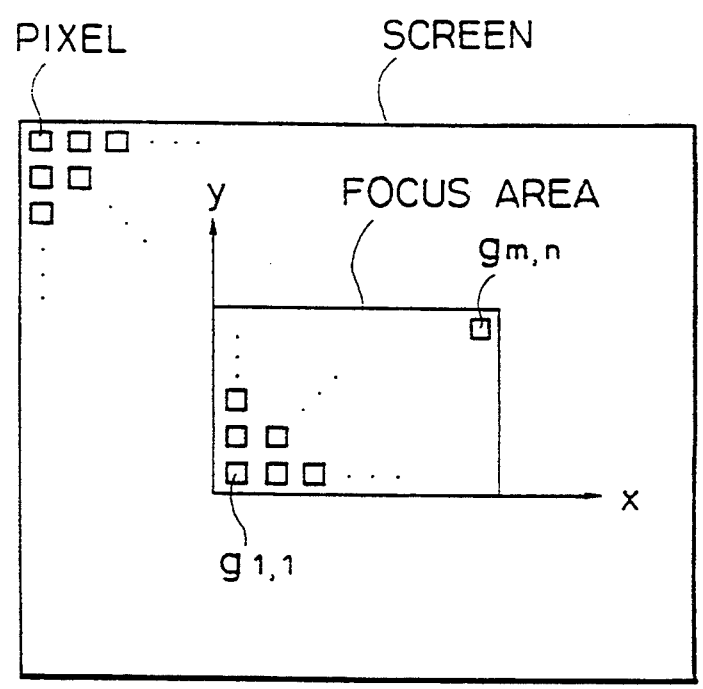

IN-FOCUS DETECTION METHOD AND METHOD AND APPARATUS USING THE SAME FOR NON CONTACT DISPLACEMENT MEASUREMENT

BACKGROUND OF THE INVENTION

1. Field of the Invention

The present invention relates to an in-focus detection method in which an image of the surface of a measuring object is picked up by a video camera while the distance to the measuring object is changed and an in-focus state of the video camera is detected from the fact that the contrast of the image has reached its maximum, as well as a method and an apparatus using the method for non-contact displacement measurement. More particularly, the present invention relates to an in-focus detection method capable of precise in-focus detection and displacement measurement not affected by periodicity, directivity, etc. of a pattern projected on a measuring object, as well as a method and an apparatus using the method for non-contact displacement measurement.

2. Description of the Prior Art

As a non-contact displacement measurement method, in which an image of the surface of a measuring object is picked up by a video camera while the distance to the measuring object is changed and the position of the surface of the measuring object is adapted to be measured according to the position of the video camera when the maximum contrast of the image is attained, that for example disclosed in Japanese Laid-open Patent Publication No. 62-2118 is known.

In this method, a lattice pattern with a predetermined period as shown in FIG. 1 for example is projected on the surface of the measuring object, a frequency component according to the lattice is extracted from an image signal of the surface of the measuring object by applying a filter to the signal, the center of gravity in the vicinity of the peak is taken as the position of the maximum amplitude on the basis of the relationship between the amplitude of the frequency component and the camera distance, and the position of the surface of the measuring object is obtained from the position of the video camera in the position of the maximum-amplitude.

As another method, there is proposed an art in Japanese Laid-open Patent Publication No. 3-261804. In this method, the principle is used that the contrast is higher and the in-focus condition is better the larger the dispersion (variance), from its average value, of the brightness $g_{x,y}$ of each pixel of the image of the surface of the measuring object is, as shown in FIG. 2. And the point at which the value of the variance is at its maximum is detected so that this point is determined as the in-focus position, and the position of the surface of the measuring object is obtained from the position of the video camera at this time.

However, in the case of the former method disclosed in Japanese Laid-open Patent Publication No. 62-2118, it is required that a lattice pattern with a predetermined period is projected on the surface of the measuring object in a predetermined direction and the periodicity and directivity of the pattern are restricted. Further, the signal component becomes weaker by application thereto of the image signal filter, leading to deterioration in the S/N ratio. Furthermore, since the lattice pattern and the data processing direction are limited to the screen scanning direction, results of the measurement are affected by the surface pattern of the measuring object. Besides, the signal frequency is affected by the condition of the end portions of the image area from which the signal is taken in (the left and right end portions when the pattern is that of vertical stripes) and, hence, such a problem arises that measurement with high precision cannot be achieved.

In the case of the latter method disclosed in Japanese Laid-open Patent Publication No. 3-261804, it sometimes occurs that the change in contrast in the vicinity of the focal point becomes lower, and therefore, there has been a problem that a sufficiently high level of measurement accuracy cannot be attained.

SUMMARY OF THE INVENTION

The present invention was made to overcome the above mentioned difficulties in the conventional art. Accordingly, it is a first object of the present invention to provide an in-focus detection method not affected by the periodicity, directivity, and the like of the pattern projected on the measuring object, capable of providing a great change in contrast in the vicinity of the focal point, and, hence, capable of achieving highly accurate detection of the in-focus state.

It is a second object of the present invention to provide a method and an apparatus for non-contact displacement measurement using the above mentioned in-focus detection method and capable of measuring the position of the surface of the measuring object with high precision.

The present invention achieves the above first object by adapting, in an in-focus detection method comprising the steps of picking up an image of the surface of a measuring object with a video camera while the distance to the measuring object is changed and detecting the in-focus state from the fact that the contrast of the image has reached its maximum, such that the contrast is obtained from the sum of the absolute value of the n-th (n: integer greater than 1) power of differences in brightness between adjoining pixels in the image.

The present invention achieves the above second object by adapting, in a non-contact displacement measurement method comprising the steps of picking up an image of the surface of a measuring object with a video camera while the distance to the measuring object is changed and measuring the position of the surface of the measuring object according to the position of the video camera when the contrast of the image has reached its maximum, such that the contrast is obtained from the sum of the n-th power of differences in brightness between adjoining pixels in the image.

The present invention further achieves the above second object by having a non-contact displacement measurement apparatus comprised of a video camera whose distance to a measuring object is adapted to be changeable, means for detecting the position of the video camera, means for calculating contrast as the sum of the absolute value of the n-th power of differences in brightness between adjoining pixels in a local area for the measurement of the displacement defined in the image of the surface of the measuring object picked up by the video camera, means for determining, by the method of least squares, the peak of the contrast calculated for each position of the video camera while the position thereof is changed, and means for obtaining the position of the surface of the measuring object according to the position of the video camera corresponding to the peak of the contrast.

In the present invention, an image of the surface of a measuring object is picked up by a video camera while the distance to the measuring object is changed and an in-focus state is detected from the fact that contrast obtained from sum of the absolute value of the n-th (n: integer greater than 1) power of differences in brightness between adjoining pixels has reached its maximum.

According to the present invention, the contrast is evaluated by such a measure, as shown in FIG. 3, that a larger gradient in brightness between adjoining pixels represents the higher contrast (more distinct image) and, hence, contrast in a specified area becomes the highest when the summation of distinctness, or sharpness, of the image in the object area is at its maximum. From the fact that the contrast greatly changes in the vicinity of the focal point, the peak of a Z-coordinate vs. contrast curve as shown in FIG. 4 becomes sharp, and accordingly, in-focus detection not affected by the periodicity or directivity of the projected pattern can be achieved in a stabilized manner and with high precision.

According to the position of the video camera at the time when the contrast defined as described above reaches its maximum, the position of the surface of the measuring object is measured, and thereby, highly precise displacement measurement becomes achievable whether pattern projection is made or not or irrespective of the surface characteristic.

Further, while the position of the video camera is changed, a curve is obtained from a number of values of the contrast for each position by the method of least squares, and the position of the video camera is determined correspondently to the peak value of the curve. Thus, a highly precise displacement measurement can be achieved even with a measuring object exhibiting a low contrast.

According to the present invention, an excellent effect can be obtained that highly precise in-focus detection and distance measurement can be achieved not affected by the periodicity, directivity, etc. of the pattern projected on the measuring object.

BRIEF DESCRIPTION OF THE DRAWINGS

The preferred embodiments will be described below with reference to the drawings, wherein like elements have been denoted throughout the figures with like reference numerals, and wherein:

FIG. 7 is a diagram showing an example of image data in the embodiment;

DESCRIPTION OF THE PREFERRED EMBODIMENTS

An embodiment of the present invention will be described below in detail with reference to the accompanying drawings.

Figure 5:
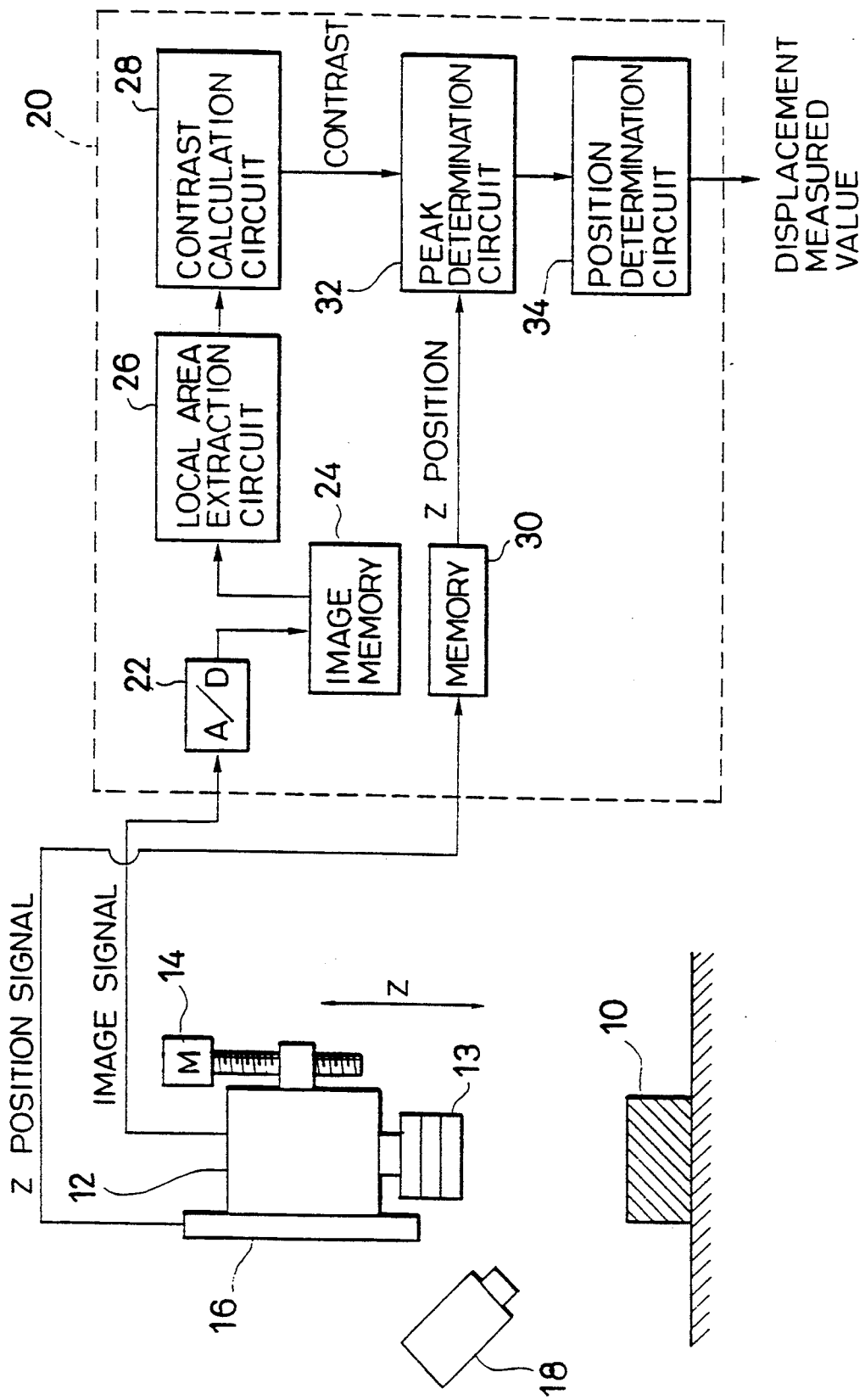
FIG. 5 is a block diagram showing an arrangement of an embodiment of non-contact displacement measurement apparatus according to the present invention.

A non-contact distance measurement apparatus according to the present embodiment is chiefly composed, as shown in FIG. 5, of a video camera 12 adapted such that its position in the Z direction, i.e., the distance to a work (measuring object) 10 can be changed by means of a camera driving apparatus 14, a position detector 16 for detecting the position of the video camera 12 in the Z direction, a pattern projector 18 capable of projecting a predetermined pattern on the surface of the work 10 according to the need in such a case where the surface to be measured is in a mirror surface state, and an image processing apparatus 20 processing the image of the work surface picked up by the video camera 12 to thereby obtain and output the distance from the work surface.

The video camera 12 is constituted for example of a CCD camera and there is disposed a lens 13 in front of it.

The position detector 16 is constituted for example of a linear displacement detector directly detecting the position in the Z direction of the video camera 12. Incidentally, the position detector 16 may be eliminated, and, instead, a rotary encoder provided on a driving motor M of the camera driving apparatus 14 for example may be used for detecting the position in the Z direction of the video camera 12.

The image processing apparatus 20 includes, as shown in FIG. 5, an A/D converter 22 for converting an analog video signal input from the video camera 12 into a digital signal, an image memory 24 for storing the output of A/D converter 22 for each frame, a local area extraction circuit 26 for extracting, from the data stored in the image memory 24, image data of a local area (called a focus area) as the object of contrast calculation for performing focusing, a contrast calculation circuit 28 for calculating contrast as the sum of squares of differences in brightness between adjoining pixels in the focus area, a memory 30 for storing the Z position signal input from the position detector 16, a peak determination circuit 32 for determining, by the method of least squares, the peak of the contrast calculated for each position while the position in the Z direction of the video camera 12 is changed by the camera driving apparatus 14, and a position determination circuit 34 for measuring the position of the surface of the work 10 from the position in the Z direction of the video camera 12 corresponding to the peak of contrast and the focal distance of the lens 13, and outputting the measured value.

Figure 6:
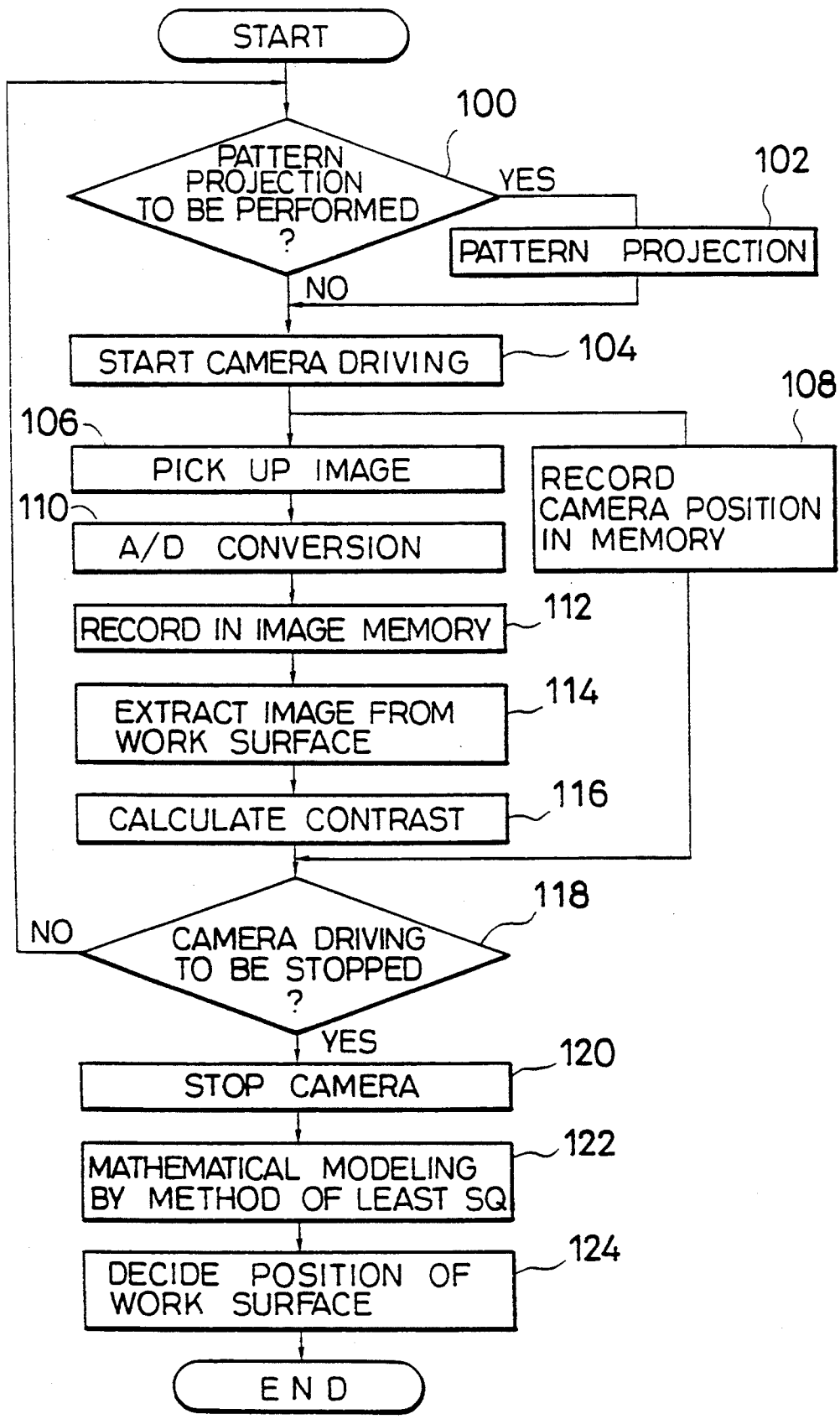
FIG. 6 is a flow chart showing steps of procedure in the embodiment.

Operation of the present embodiment will be described below with reference to FIG. 6.

First, in step 100, it is decided whether or not a pattern projection by the pattern projector 18 is to be carried out. When the surface of measurement is for example a mirror surface and it is necessary to perform the pattern projection, then in the following step 102, a pattern from the pattern projector 18 is projected on the surface of the work 10. When there is a surface pattern or the like enabling the contrast to be detected on the surface of measurement, the pattern projection can be omitted.

When step 102 has been finished or when the decision in the above step 100 has been NO, then in step 104, the driving of the video camera 12 including an optical system is started by the camera driving apparatus 14 so that the distance to the work 10 is changed.

Then in the following step 106, the image of the surface of the work 10 is picked up by the video camera 12. The image picking up is continuously carried out and, in parallel therewith, the positions in the Z direction of the video camera 12 at the times of image pickup are recorded in the memory 30 in step 108.

In the following step 110, the output image signal of the video camera 12 is A/D converted by the A/D converter 22.

Then, in the following step 112, the output of the A/D converter 22 is recorded in the image memory 24.

Then, in the following step 114, data of the focus area as shown in FIG. 7 is extracted from the data of the entire screen recorded in the image memory 24 by the local area extraction circuit 26.

In the following step 116, the contrast defined in the present invention by the sum of squares of differences in brightness between adjoining pixels is calculated on the real time basis by the contrast calculation circuit 28 for example according to the following equation.

$$\text{contrast} = \sum_{y=1}^{n-1} \sum_{x=1}^{m-1} (g_{x+1,y} - g_{x,y})^2 + \sum_{x=1}^{m-1} \sum_{y=1}^{n-1} (g_{x,y+1} - g_{x,y})^2 \quad (1)$$

where $g_{x,y}$ is the brightness of the pixel at the coordinates (x, y), and the focus area is represented by $g_{1,1}$ to $g_{m,n}$.

Figure 8:
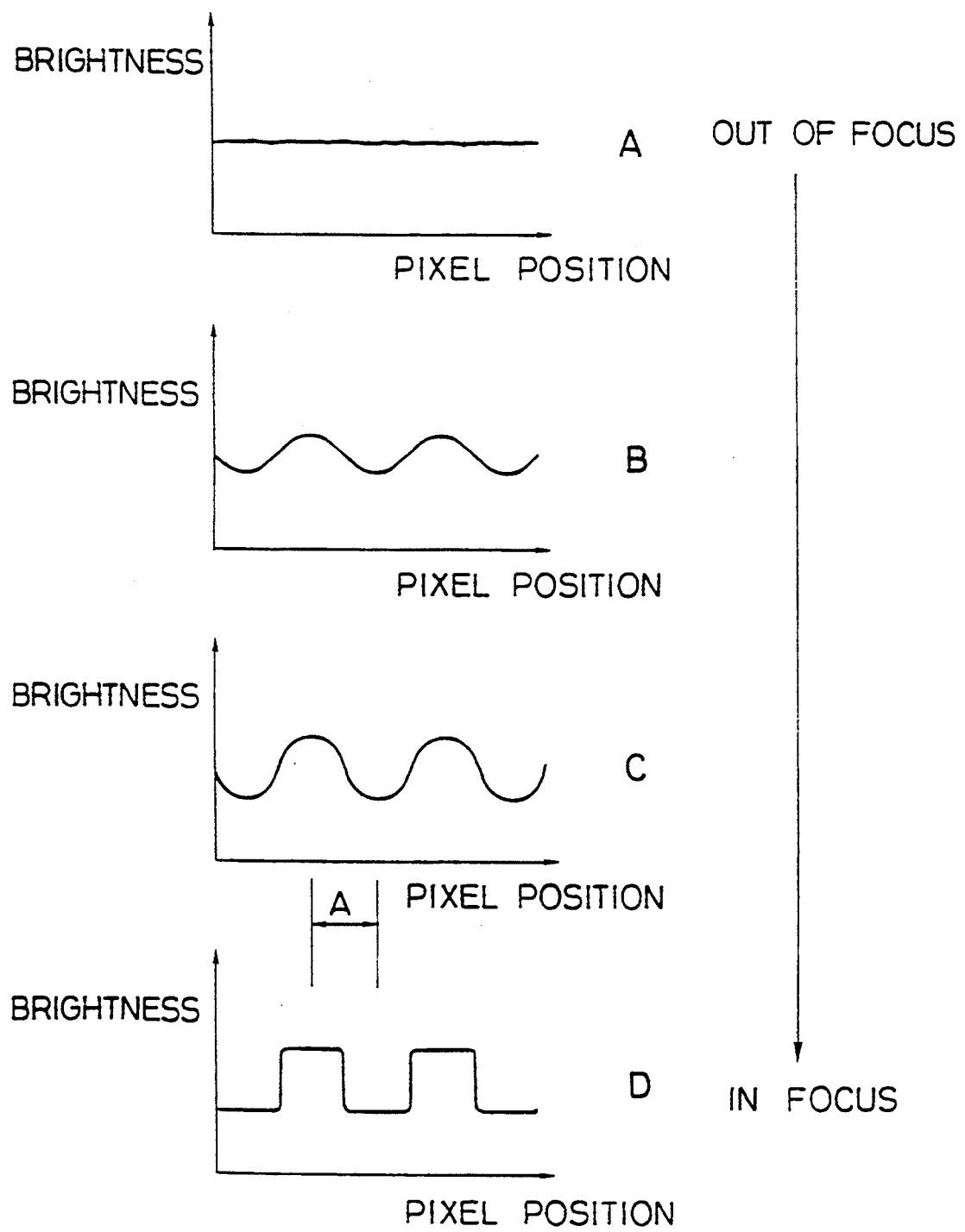
FIG. 8 is a diagram showing an example of changes in the image occurring in the embodiment during the transition from the out-of-focus state to the in-focus state.
Figure 9:
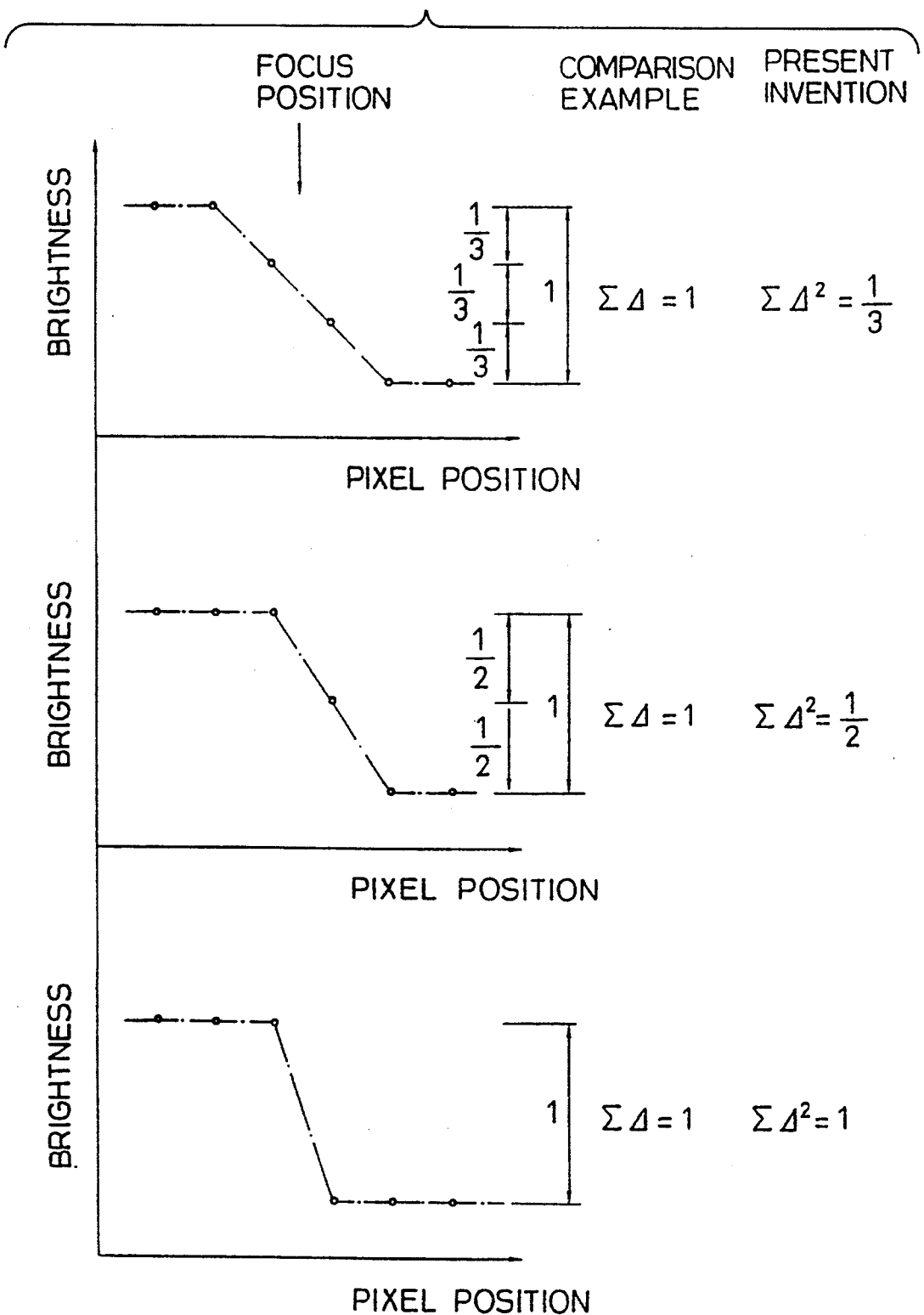
FIG. 9 is a diagram showing evaluations of contrast in the vicinity of the focal point obtained in the embodiment as compared with those obtained in a comparison example.

The reason why the squares of differences are used in equation (1) is given as under. When a lattice pattern is projected for example on a mirror-surfaced work, the image changes from that in an out-of-focus state as shown in FIG. 8A to that in an in-focus state as shown in FIG. 8D. Then, in the transition from C to D, the evaluation of the contrast cannot be achieved by the sum of differences. The image of the portion A in the transition from C to D is depicted in FIG. 9 microscopically, in units of pixels constructing the image. Setting the difference in brightness between the light portion and the dark portion to 1, the contrast value, when the edge in the lattice pattern was distinct, evaluated by the sum of differences ΣΔ (comparison example) and the sum of squares of differences $\Sigma\Delta^2$ (present invention) are shown on the right of each of the diagrams in FIG. 9.

As apparent from FIG. 9, while it is impossible to show the change in contrast when the edge was distinct by the method of the comparison example, it can be positively evaluated by the method of the present invention. Thus, the resolving power in the vicinity of the focal point can be increased and measurement not affected by whether or not the pattern projection is carried out or by the property of the surface of the measuring object can be achieved.

The reason why the calculation is performed in both x direction and y direction in the equation (1) is because directivity is involved in the contrast in the present invention.

While the video camera 12 is driven by the camera driving apparatus 14 so that its position in the Z axis is changed, the contrast in each position is calculated. The calculation of contrast can be performed in various directions because the calculation is performed by software on the image quantized and stored in the image memory 24.

Then, in step 118, it is decided whether or not the video camera 12 has reached the position where the driving of the camera should be stopped. When the decision is NO, the flow returns to the above step 104 and the collection of contrast data is continued further.

When the decision in step 118 is YES, i.e., when it is judged that the video camera 12 has reached the predetermined position in the Z direction (limit of search), then in the following step 120, the driving of the video camera 12 is stopped.

Figure 1:
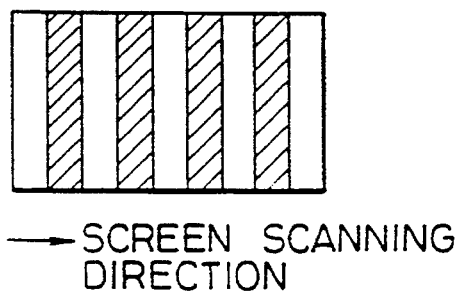
FIG. 1 is a plan view showing an example of lattice pattern which is indispensable for measurement of position in the Z axis according to Japanese Laid-open Patent Publication No. 62-2118.
Figure 2:
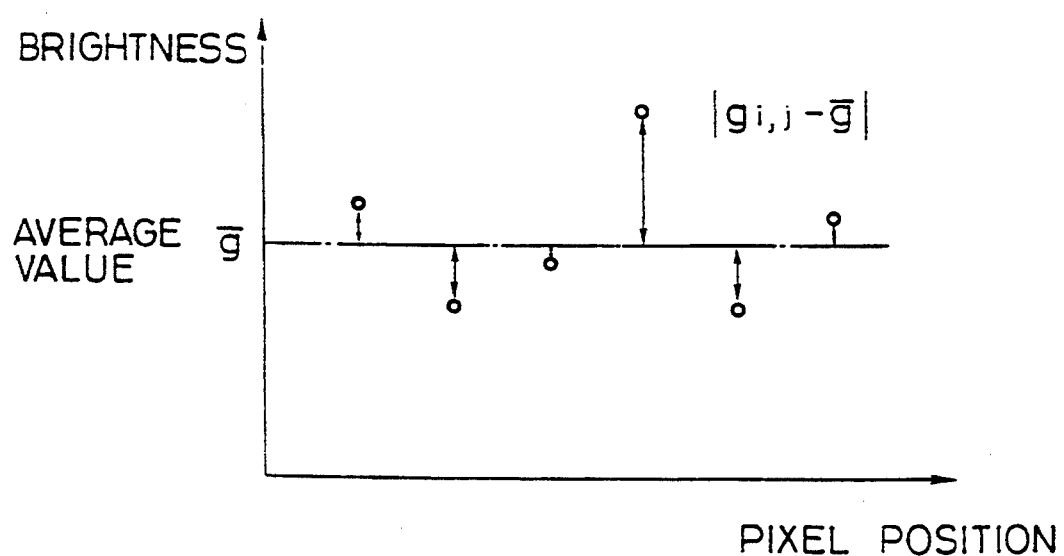
FIG. 2 is a diagram showing the definition of contrast on the basis of variance employed in Japanese Laid-open Patent Publication No. 3-261804.
Figure 3:
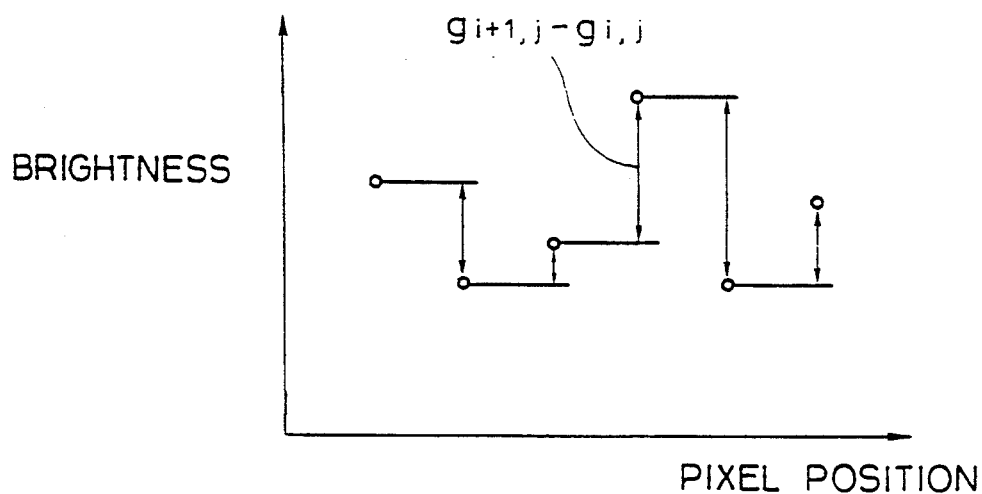
FIG. 3 is a diagram showing the definition of contrast employed in the present invention.
Figure 4:
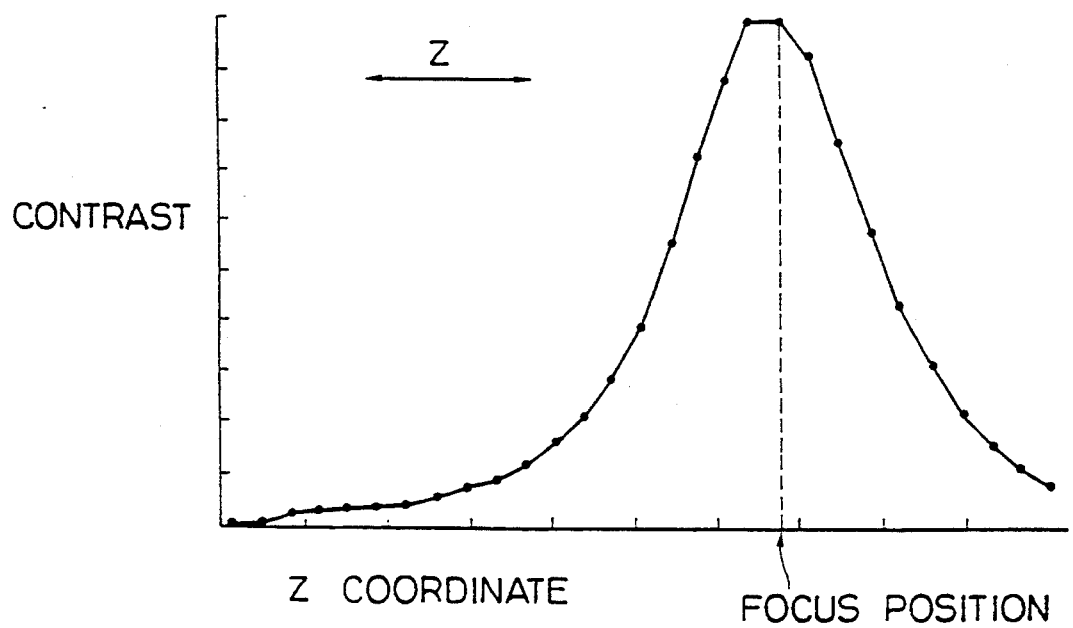
FIG. 4 is a diagram showing an example of relationship between Z-contrast curve and position of focal point.
Figure 10:
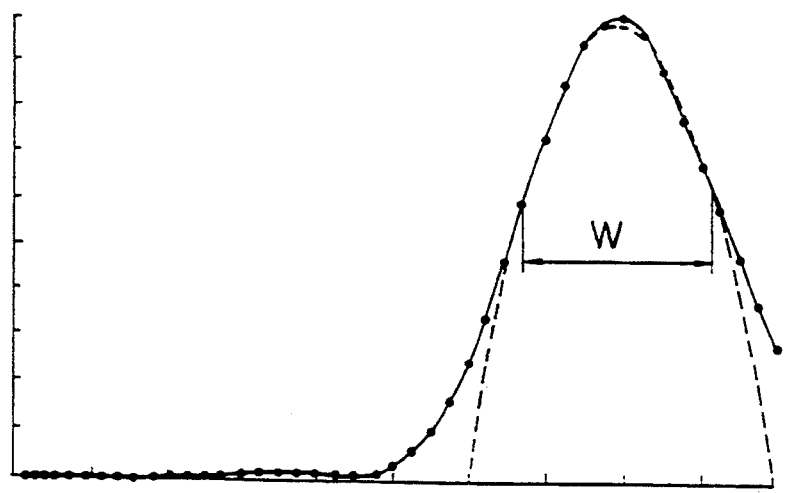
FIG. 10 is a diagram showing a state of the Z-contrast curve with a quadratic curve applied thereto in the embodiment.

Then, in step 122, as shown in FIG. 10, a quadratic curve for example is applied to a range W in the vicinity of the peak of the curve expressing the contrast with respect to the Z coordinate as shown in FIG. 4 by the peak determination circuit 32 using for example the method of least squares, so that interpolation is applied to the portions between measured points (sampled points), and the peak position is determined from the mathematical model of the curve.

Here, representing the range in which approximation with a quadratic curve can be made by W and the sampling time by t (constant value), the following relationship holds between the driving velocity v along the Z axis and the number of samples n used for the approximation $$v = W/(n \times t) \quad (2)$$

Figure 11:
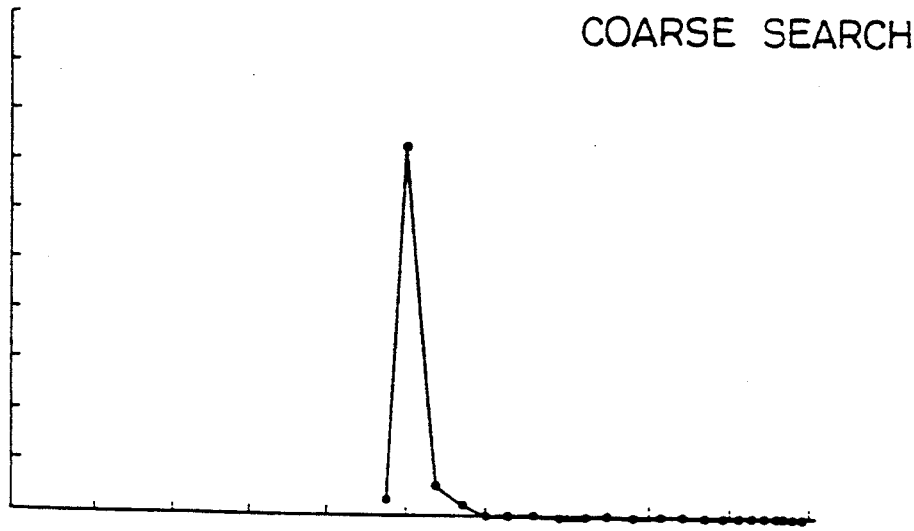
FIG. 11 is a diagram showing an example of Z-contrast curve handled in a coarse search in the embodiment.
Figure 12:
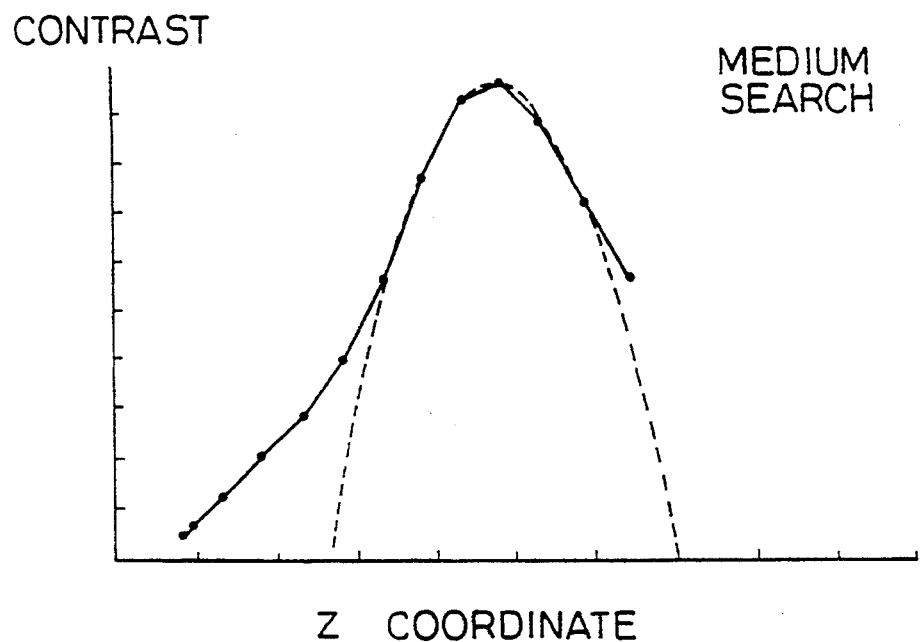
FIG. 12 is a diagram showing an example of Z-contrast curve handled in a medium search in the embodiment.
Figure 13:
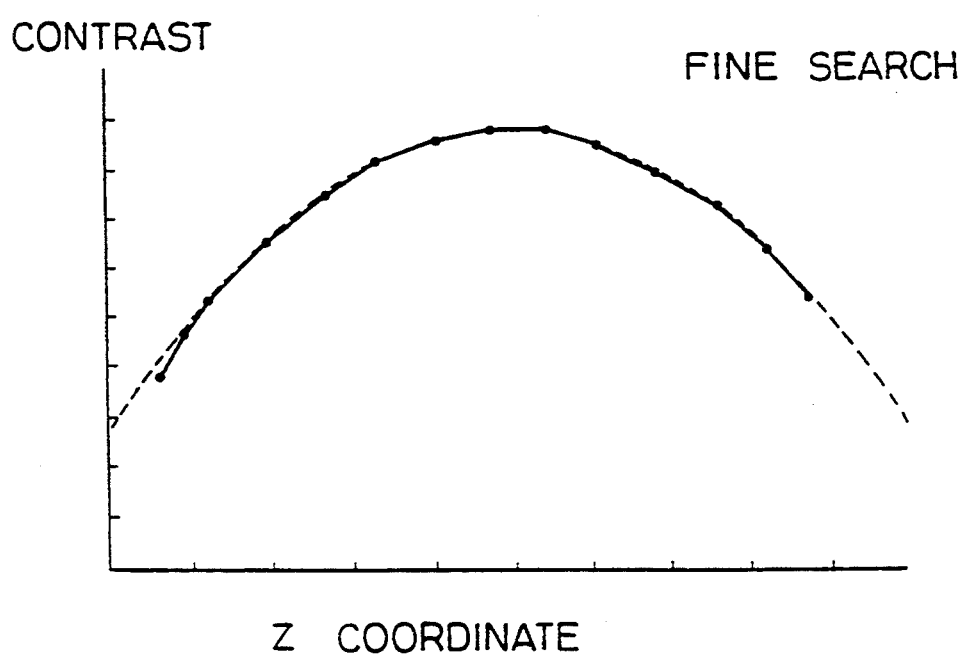
FIG. 13 is a diagram showing an example of Z-contrast curve handled in a fine search in the embodiment.

When the sequence of focusing is divided in three steps, i.e., in coarse, medium, and fine focusing, the decision of the peak can be performed in this way. First, as shown in FIG. 11, a coarse search is performed, in which the video camera 12 is moved at a high speed over the entire range of movement, and, thereby, the peak position is coarsely determined and the range for a medium search is defined. Then, as shown in FIG. 12, a medium search is performed, in which the video camera 12 is moved at a medium speed over the range for the medium search defined in the coarse search, and, thereby, the peak position is roughly determined within the range for the medium search and the range for a fine search is defined. Thereafter, as shown in FIG. 13, a fine search is performed, in which the video camera 12 is moved at a low speed within the narrow range for the fine search defined in the medium search, and, thereby, the peak position is finally determined with high precision.

Then, in step 124, the position of the work surface is determined by the position determination circuit 34 from the position in the Z direction of the video camera 12 corresponding to the above determined peak and the focal distance of the lens 13 and the determined value is output, and thereafter the measurement is ended.

While the present invention was used for non-contact displacement measurement in the above embodiment, the range of application of the present invention is not limited to that. It is also possible to detect an in-focus state from the fact that the contrast defined in this invention has reached its maximum.

What is claimed is:

1. A non-contact displacement measurement apparatus for measuring a displacement between a camera and an object, based on a contrast measurement of an image portion of the object, the camera having a fixed focal length, the apparatus comprising:
   means for detecting a position of the camera;
   camera moving means for changing the position of the camera relative to the object;
   means for determining the contrast measurement of the image portion, wherein the contrast measurement is determined for each position of the camera based on differences in brightness between adjoining pixels of the image portion;
   means for determining when said contrast measurement is at a maximum value; and
   means for determining the displacement between the camera and the object using the position of said camera when the contrast measurement is at the maximum value.

2. The non-contact displacement measurement apparatus according to claim 1, further comprising a pattern projector for projecting a predetermined pattern on a surface of said object.

3. The non-contact displacement measurement apparatus according to claim 1, wherein said means for detecting the position of said camera is a rotary encoder provided on a driving motor of said camera moving means.

4. The non-contact displacement measurement apparatus according to claim 1, further comprising local area extraction means for extracting a local area from the image of the object, the local area being the image portion used by the contrast measurement determining means.

5. The non-contact displacement measurement apparatus according to claim 1, further comprising:
   an image memory coupled to the camera for storing an image of the object; and
   a position memory coupled to the means for detecting the camera position for storing the position of said camera.

6. The non-contact displacement measurement apparatus according to claim 1, wherein said contrast measurement is determined from a sum of squares of differences in brightness between adjoining pixels in both vertical and horizontal directions.

7. The non-contact displacement measurement apparatus according to claim 1, wherein said maximum contrast measurement determining means comprises a peak determining circuit generating coarse, medium and fine contrast measurement signals, the coarse, medium and fine contrast measurement signals being generated by the peak determining circuit when the camera moving means changes the position of the camera at corresponding first, second and third displacement increments.

8. The non-contact displacement measurement apparatus according to claim 1, wherein the contrast measurement comprises a sum of an absolute value of an $n^{th}$ power of differences in the brightness value between adjoining pixels, where n is an integer greater than 1.

9. A method for placing a camera in an in-focus state, the camera having a fixed focal length, the method comprising the steps of:
   capturing an image of a surface of an object using the camera;
   measuring brightness values of pixels of an image portion of the image;
   measuring a contrast of said image portion based on the measured brightness values;
   changing a camera position of the camera along a line between the camera and the object;
   detecting when the measured contrast of said image portion reaches a maximum value; and
   placing the camera in the in-focus state by stopping the camera from further movement at the camera position corresponding to the maximum value of the measured contrast.

10. The method according to claim 9, wherein the step of measuring the contrast comprises the step of determining a sum of an absolute value of an $n^{th}$ power of differences in the brightness value between adjoining pixels, where n is an integer greater than 1.

11. The method according to claim 9, wherein the step of measuring the contrast comprises the step of determining a sum of squares of differences in the brightness value between adjoining pixels in both vertical and horizontal directions.

12. The method according to claim 9, further comprising the step of projecting a predetermined pattern onto the surface of the object when the object is in a mirror surface state.

13. A non-contact method for measuring a displacement value between a camera and an object, the camera having a fixed focal length, the method comprising the steps of:
   capturing an image of a surface of an object using the camera;
   measuring brightness values of pixels of an image portion of the image;
   measuring a contrast of said image portion based on the measured brightness values;
   changing a camera position of the camera along a line between the camera and the object;
   detecting when the measured contrast of said image portion reaches a maximum value; and
   stopping the camera from further movement;
   determining the displacement between the surface of the object and the position of the camera when the contrast measurement of the image portion is the maximum value; and
   outputting the displacement.

14. The method according to claim 13, wherein the step of measuring the contrast comprises the step of determining a sum of an absolute value of an $n^{th}$ power of differences in the brightness value between adjoining pixels, where n is an integer greater than 1.

15. The method according to claim 13, wherein the step of measuring the contrast comprises the step of determining a sum of squares of differences in the brightness value between adjoining pixels in both vertical and horizontal directions.

16. The method according to claim 13 further comprising the step of projecting a predetermined pattern onto the surface of the object when the object is in a mirror surface state.

* * * * *